United States Patent [19]

Bruner et al.

[11] Patent Number: 4,768,575
[45] Date of Patent: Sep. 6, 1988

[54] PNEUMATIC TUBELESS TIRE AND METHOD OF SPLICING TOGETHER THE ENDS OF A CARCASS FABRIC THEREOF

[75] Inventors: Jeffrey W. Bruner; David W. Tarlton, both of Greensboro, N.C.

[73] Assignee: Highland Industries, Inc., Greensboro, N.C.

[21] Appl. No.: 809,783

[22] Filed: Dec. 17, 1985

[51] Int. Cl.$^4$ .................. B60C 15/00; B60C 9/00
[52] U.S. Cl. .................. 152/552; 66/195; 152/548; 152/556; 152/563; 156/134; 156/304.3
[58] Field of Search .................. 156/134, 148, 304.1, 156/304.2, 304.3, 310, 123, 130.7, 132, 110.1, 196, 199, 215; 152/556, 557, 548, 563, 510, 552, 560; 66/195

[56] References Cited

U.S. PATENT DOCUMENTS

| | | | |
|---|---|---|---|
| 3,237,673 | 3/1966 | Ward | 156/134 X |
| 3,763,913 | 10/1973 | French et al. | 152/526 |
| 3,830,276 | 8/1974 | Smithkey, Jr. | 152/528 |
| 4,226,655 | 10/1980 | Bush | 156/132 |
| 4,249,587 | 2/1981 | Duttlinger | 152/530 |
| 4,261,393 | 4/1981 | Saito et al. | 152/563 X |
| 4,287,930 | 9/1981 | McIntosh et al. | 152/526 |
| 4,295,513 | 10/1981 | Lovell et al. | 152/563 |
| 4,325,423 | 4/1982 | Seitz et al. | 152/526 |
| 4,360,397 | 11/1982 | Caretta | 156/134 |
| 4,453,993 | 6/1984 | Rau et al. | 152/132 X |
| 4,466,473 | 8/1984 | Matyja et al. | 152/548 |
| 4,585,044 | 4/1986 | Carrera et al. | 152/563 X |

FOREIGN PATENT DOCUMENTS 0120623 10/1984 European Pat. Off. .
57-8142 1/1982 Japan .

Primary Examiner—Michael Ball
Assistant Examiner—Thomas Bokan
Attorney, Agent, or Firm—Nixon & Vanderhye

[57] ABSTRACT

A pneumatic tubeless tire is produced in such a way that the tire cord fabric (also known as the tire carcass fabric or ply fabric) has the ends thereof secured during tire building so that separation of the cord fabric ends, and a resulting blemish, does not occur. The carcass fabric is wrapped around a rubber inner lining body with turned up portions of the carcass fabric at a pair of beads on opposite sides of the body, during tire construction. The free ends of the carcass fabric are butted together around the body, to provide a butt seam. The free ends are held together in substantial butting position by placing an open mesh warp knit splicer fabric highly extensible in both the machine and cross-machine directions over the butt seam and affixing the splicer fabric in place using adhesive or the like. Rubber tack may be applied over the splicer fabric. The open mesh fabric appears to have no machine direction or cross-machine direction yarns, but only bias yarns. It typically comprises a two bar partially threaded warp knit mesh fabric whereby the threading is one in, one out, on both the back guide bar and the front guide bar.

11 Claims, 2 Drawing Sheets

PNEUMATIC TUBELESS TIRE AND METHOD OF SPLICING TOGETHER THE ENDS OF A CARCASS FABRIC THEREOF

BACKGROUND AND SUMMARY OF THE INVENTION

In the manufacture of pneumatic tubeless radial tires, reinforcing fabrics are utilized in order to get the desired properties in the final tire construction. The reinforcing fabrics are alternatively referred to as the carcass fabric, cord fabric, or ply fabric. Such fabrics typically have a number of large denier yarns extending in one direction (e.g. the warp direction), the yarns being held only loosely together, for example by widely spaced small denier weft yarns interwoven with the warp yarns. The fabric is tackified, as by calendering it with rubber, so that it will properly adhere to unvulcanized vulcanizable rubber during the construction of the tire. The sidewalls, any reinforcing belts (such as fiberglass belts), and tread portion of the tire are then disposed on or formed around the carcass fabric.

During tire building, the free ends of the carcass fabric are joined together at a particular circumferential portion surrounding a rubber inner lining body of the tire. Typically the free ends of the carcass fabric are merely butted up against each other. Since the carcass fabric is not secured during tire building, oftentimes the free ends separate, resulting in a blemish due to the recess or valley formed at the point of separation, on the sidewall of the tire. Many conventional woven and knitted tire fabrics have been evaluated without successfully remedying this problem.

According to the present invention, a method is provided for splicing together the ends of the carcass fabric so that separation of the ends of the carcass fabric, with ensuing blemish, does not result. This desirable result also is achieved without requiring overlapping of the end portions of the carcass fabric, which itself may produce undesirable results in the final tire.

According to the method of the present invention, the carcass fabric is wrapped around a rubber inner lining body, with turned up portions of the carcass fabric at a pair of beads on opposite sides of the body, during tire construction, as is conventional. The free ends of the carcass fabric are butted together around the body to provide a butt seam, also as conventional. The free ends of the carcass fabric are held together in butting position by placing an open mesh warp knit splicer fabric, one that is highly extensible in both the machine and cross-machine directions, over the butt seam and affixing the splicer fabric in place. The splicer fabric is preferably held in place by an adhesive. The open mesh warp knit fabric according to the invention appears to have no machine direction or crossmachine direction yarns, but only bias yarns. Although the actual fabric does have two sets of warps (machine directions yarns) which are distended in the cross machine direction when the fabric is finished yielding a bias appearance. This is necessary in order to get the extensibility, conformity, and strike through properties desired for the splicer fabric. Typically the warp knit fabric is a two bar partially threaded warp knit mesh fabric whereby the threading is one in, one out, on both the back guide bar and the front guide bar.

The invention also contemplates a pneumatic tubeless radial tire which is constructed utilizing the butt seam between the carcass fabric ends, with the open mesh splicer fabric according to the invention adhesively secured in place over the butt seam to the carcass fabric. The tire according to the invention will not have blemishes in the sidewalls thereof due to a recess or valley formed as a result of separation of the carcass fabric, nor will there be like surface imperfections due to overlapping of the carcass fabric ends.

It is the primary object of the present invention to provide a method of splicing together the ends of a carcass fabric during the building of a pneumatic tubeless tire which substantially eliminates blemishes in the sidewalls of tires produced, and the blemish-free tires produced according to the method. This and other objects of the invention will become clear from an inspection of the detailed description of the invention and from the appended claims.

BRIEF DESCRIPTION OF THE DRAWINGS

FIG. 5 has been rotated 90° clockwise.

DETAILED DESCRIPTION OF THE DRAWWINGS

Figure 1:
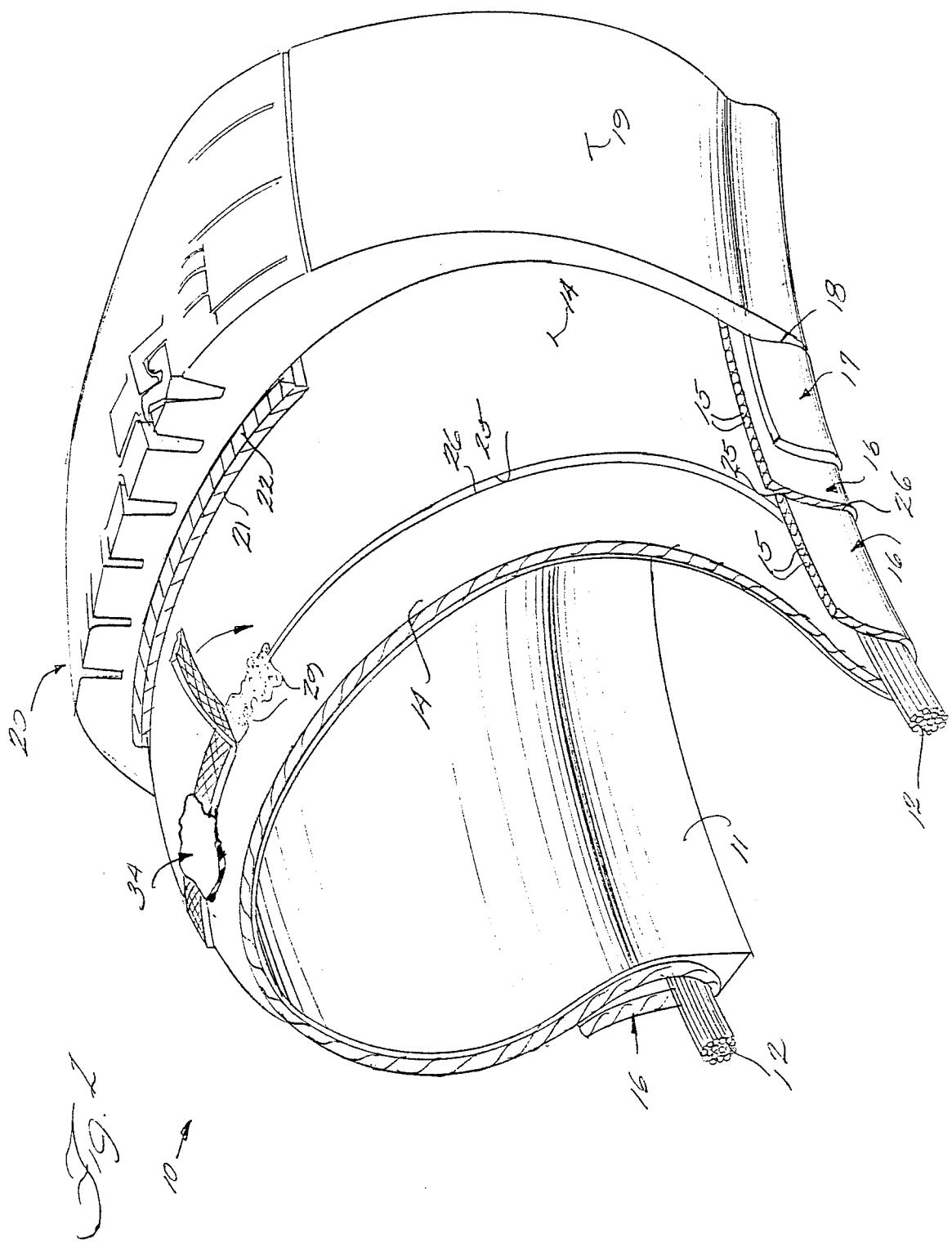
FIG. 1 is a perspective cut-away view of an exemplary tire according to the present invention, with the splicer fabric shown during a stage of application thereof.

FIG. 1 illustrates an exemplary construction of a tire which utilizes the splicer fabric according to the present invention during the tire building process. The tire 10 illustrated in FIG. 1 includes a rubber inner lining body 11, and beads 12 on opposite sides thereof at the portion of the final tire which will form the rim. Encircling the body 11 is a carcass fabric 14, which typically has high denier yarns, seen at the side edges in FIG. 1 and denoted by the reference numerals 15, which extend circumferentially around the tire, the carcass fabric preferably being tackified, as by calendering with rubber. The carcass fabric 14 includes the turned up portions 16 which surround the beads 12. Other conventional elements of the tire 10 include the toe guard 17, a chafer fabric 18, and an encapsulating rubber exterior including sidewall portions 19 and a tread portion 20. Typically reinforcing belts, such as fiberglass or steel belts, 21, 22, would be placed on top of the carcass fabric 14, with the tread portion 20 of the rubber exterior overlying the belts 21, 22.

During the tire building process, the free ends 25, 26 of the carcass fabric 14 are brought to a position adjacent each other. The ends 25, 26 preferably are moved into butting engagement. For clarity of illustration in FIG. 1, the ends 25, 26 are illustrated as having a gap between them, but in actual practice it is desired that the ends 25, 26 do actually butt so that there is no gap between them at all.

According to the present invention a mechanism is utilized for holding the free ends 25, 26 of the carcass fabric 14 in the butted position, in which a butt seam is formed at the ends 25, 26. The mechanism for accomplishing this according to the present invention comprises a splicer fabric 28 which is placed over the butt seam, and affixed to the carcass fabric overlying the butt seam, as by a suitable adhesive, illustrated schematically at 29 in FIG. 1. In FIG. 1 the splicer fabric 28 is shown being laid down over the butt seam, and in actual construction the splicer fabric 28 is long enough so that it extends the entire length of the butt seam, including at the turned up portions 16 of the carcass fabric 14. While the belts 21, 22 and the tire exterior portions 19, 20 are illustrated in FIG. 1, it is to be understood that those are only put in place, or formed, after the splicer fabric 28 has been disposed substantially completely along the length of the butt seam, and the adhesive 29 has acted to hold splicer fabric 28 in place on the carcass fabric 14.

Figure 2:
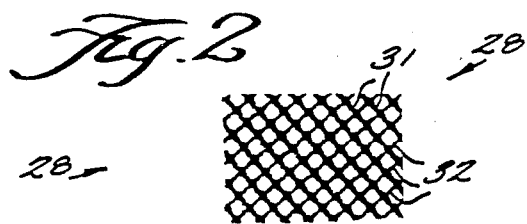
FIG. 2 is a top plan view of an exemplary construction of open mesh warp knit fabric utilizable as the splicer fabric according to the present invention.
Figure 3:
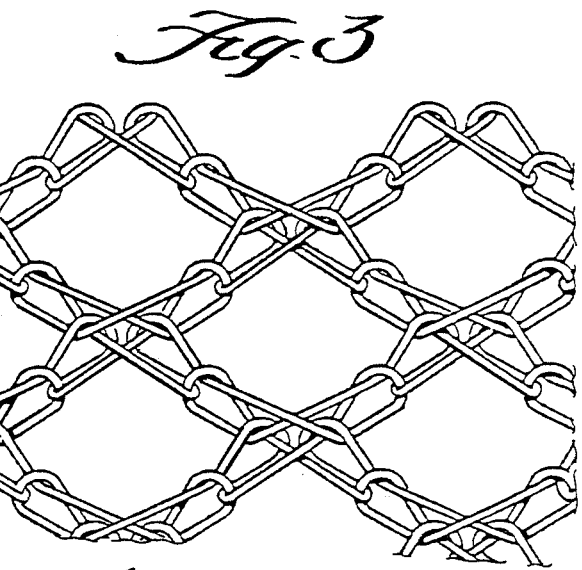
FIGS. 3 through 6 are stitch diagrams illustrating the details of a number of different exemplary open mesh warp knit fabrics utilizable as a splicer fabric according to the present invention.
Figure 4:
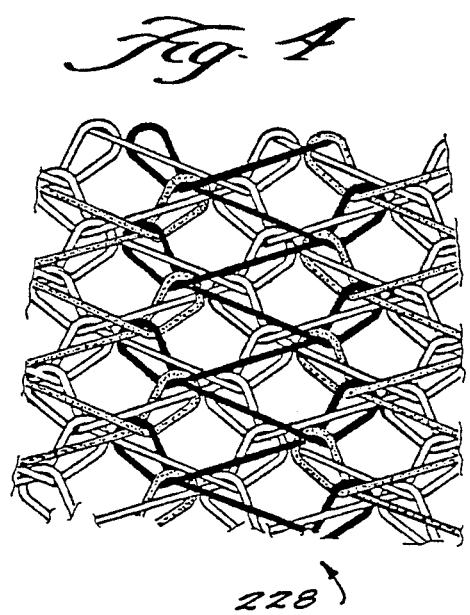
Figure 6:
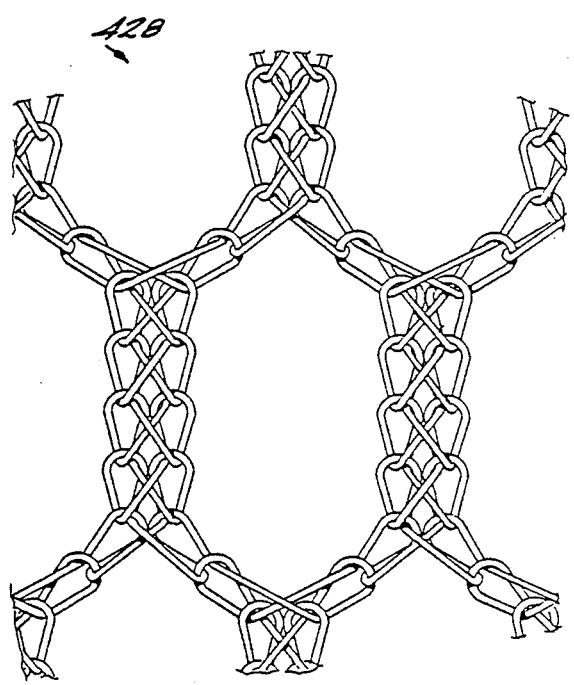
Figure 5:
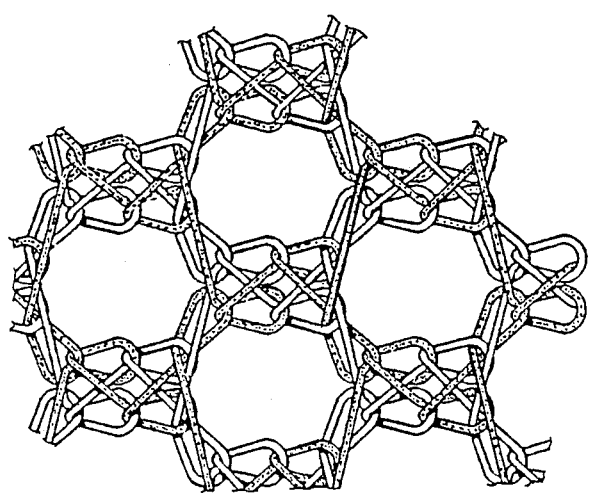

The splicer fabric 28 according to the present invention is illustrated in FIG. 2, and comprises an open mesh warp knit fabric having no apparent machine direction or cross-machine direction yarns but only bias yarns. Two sets of bias reinforcement members 31, 32, respectively, are illustrated in FIG. 2. This geometry of the splicer fabric 28 provides the necessary extensibility, conformity, and strike through properties for the splicer fabric 28 that allows it to perform its desired function during tire construction. The fabric 28 is highly extensible in both the machine and cross-machine directions, for example having an extensibility of around 50-150 percent.

FIGS. 3 through 6 illustrate a number of different possible configurations for the fabric 28, however they certainly are not limiting, but merely are exemplary of the different types of open mesh configurations the fabric 28 may have. For each of the FIGS. 3 through 6 embodiments, two bar partially threaded warp knit mesh fabric is produced with one in, one out, on both bars. More specifically, for the splicer fabric 128 illustrated in FIG. 3, the back guide bar movement is 1-0/1-2/2-3/2-1, and the front guide bar movement is 2-3/2-1/1-0/1-2. For the splicer fabric 228 illustrated in FIG. 4, the back guide bar movement is 1-0/2-3, while the front guide bar movement is 2-3/1-0. For the splicer fabric 328 illustrated in FIG. 5, the back guide bar movement is 2-3/2-1/2-3/1-0/1-2/1-0, while the front guide bar movement is 1-0/1-2/1-0/2-3/2-1/2-3. For the splicer fabric 428 illustrated in FIG. 6, the back guide bar movement is 2-3/2-1/1-0/1-2, while the front guide bar movement is 1-0/1-2/2-3/2-1. All of the fabrics 128, 228, 328, 428 can be produced on a conventional warp knitting machine.

The yarn that is utilized to produce the splicer fabrics according to the present invention preferably is a relatively small denier yarn (e.g. 40-200), and is preferably a synthetic, such as nylon, polyester, or aramid. Multifilament yarn is preferred. The adhesive 29 for holding the splicer fabric 28 in place may be any suitable adhesive for holding the materials of the splicer fabric to the tire stock, whether it is calendered or not, such as an RFL system with a subsequent rubber application to provide building tack. Reference numeral 34 in FIG. 1 shows a rubber application that has been made to the fabric 28 to provide tack. The rubber tack 34 would normally be applied over the entire length of fabric 28.

It will thus be seen that according to the present invention a method has been provided for splicing together the ends of a tire cord fabric during the build up of a pneumatic radial tubeless tire, to produce a tire having blemish-free sidewalls. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of splicing together ends of a carcass fabric during the construction of a pneumatic tubeless tire, comprising the steps of:
   (a) wrapping the carcass fabric around a rubber inner lining body, with turned up portions of the carcass fabric at a pair of beads on opposite sides of the body, during tire construction, the carcass fabric having free ends;
   (b) butting together the free ends of the carcass fabric around the body to provide a butt seam; and
   (c) substantially holding the free ends of the carcass fabric together in butting position by placing an open mesh warp knit splicer fabric that is highly extensible in both the machine and cross-machine directions over the butt seam and affixing the splicer fabric in place over the butt seam.

2. A method as recited in claim 1 wherein step (c) is practiced by attaching the splicer fabric with adhesive to the carcass fabric.

3. A method as recited in claim 2 wherein the splicer fabric comprises a two bar partially threaded warp knit mesh fabric whereby the threading is one in, one out, on both bars.

4. A method as recited in claim 3 wherein the splicer fabric is produced by a back guide bar movement of 1-0/1-2/2-3/2-1, and a front guide bar movement of 2-3/2-1/1-0/1-2.

5. A method as recited in claim 3 wherein the splicer fabric is produced by a back guide bar movement of 1-0/2-3, and a front guide bar movement of 2-3/1-0.

6. A method as recited in claim 3 wherein the splicer fabric is produced by a back guide bar movement of 2-3/2-1/2-3/1-0/1-2/1-0, and a front guide bar movement of 1-0/1-2/1-0/2-3/2-1/2-3.

7. A method as recited in claim 3 wherein the open mesh fabric is produced by a back guide movement of 2-3/2-1/1-0/1-2, and a front guide bar movement of 1-0/1-2/2-3/2-1.

8. A method as recited in claim 2 wherein the open mesh fabric appears to have no machine direction or cross-machine direction extending yarns, but only bias yarns, and comprising the further step of putting a rubber tack over the splicer fabric.

9. A method as recited, in claim 1 wherein the open mesh fabric appears to have no machine direction or cross-machine direction extending yarns, but only bias yarns.

10. A method as recited in claim 1 wherein the splicer fabric comprises a two bar partially threaded warp knit mesh fabric whereby the threading is one in, one out on both bars.

11. A pneumatic tubeless tire constructed by the steps of:
   (a) wrapping the carcass fabric around a rubber inner lining body, with turned up portions of the carcass fabric at a pair of beads on opposite sides of the body, during tire construction, the carcass fabric having free ends;
   (b) butting together the free ends of the carcass fabric around the body to provide a butt seam; and
   (c) substantially holding the free ends of the carcass fabric together in butting position by placing an open mesh warp knit splicer fabric that is highly extensible in both the machine and cross-machine directions over the butt seam and affixing the splicer fabric in place over the butt seam, to produce the pneumatic tubeless tire.

* * * * *